US012605647B2

(12) United States Patent
Hinz et al.

(10) Patent No.: US 12,605,647 B2
(45) Date of Patent: \*Apr. 21, 2026

(54) PROCESS WATER DISTILLATION PLANT AND METHOD FOR OPERATING A PROCESS WATER DISTILLATION PLANT

(71) Applicant: KMU LOFT Cleanwater SE, Kirchentellinsfurt (DE)

(72) Inventors: Jutta Hinz, Schopfheim (DE); Manfred Schnell, Schopfheim (DE); Jorge Mario Toto Santamaria, Dusslingen (DE)

(73) Assignee: KMU LOFT CLEANWATER SE, Kirchentellinsfurt (DE)

( \* ) Notice: Subject to any disclaimer, the term of this patent is extended or adjusted under 35 U.S.C. 154(b) by 76 days.

This patent is subject to a terminal disclaimer.

(21) Appl. No.: 18/033,466

(22) PCT Filed: Sep. 14, 2021

(86) PCT No.: PCT/EP2021/075242
§ 371 (c)(1),
(2) Date: Apr. 24, 2023

(87) PCT Pub. No.: WO2022/089827
PCT Pub. Date: May 5, 2022

(65) Prior Publication Data
US 2023/0398467 A1 Dec. 14, 2023

(30) Foreign Application Priority Data
Nov. 2, 2020 (DE) ..................... 10 2020 128 823.9

(51) Int. Cl.
B01D 3/34 (2006.01)
B01D 1/28 (2006.01)
(Continued)

(52) U.S. Cl.
CPC ........... B01D 1/2896 (2013.01); B01D 3/346 (2013.01); B01D 3/42 (2013.01); B01D 5/006 (2013.01);
(Continued)

(58) Field of Classification Search
CPC ........ B01D 1/2896; B01D 3/346; B01D 3/42; B01D 5/006; C02F 1/008; C02F 1/041; C02F 1/043; C02F 1/048
See application file for complete search history.

(56) References Cited

U.S. PATENT DOCUMENTS 3,925,149 A * 12/1975 Erwin .................... B01D 3/346
159/31
4,260,461 A * 4/1981 Pottharst, Jr. ............ B01D 1/10
202/180
(Continued)

FOREIGN PATENT DOCUMENTS

CN 206492231 U 9/2017
CN 208975193 U 6/2019
(Continued)

OTHER PUBLICATIONS

Search Report, German Application No. 10 2020 128 823.9; Dated May 12, 2021.
(Continued)

*Primary Examiner* — Jonathan Miller
(74) *Attorney, Agent, or Firm* — Falcon Rappaport & Berkman LLP

(57) ABSTRACT

A process water distillation system (10) comprises an evaporator (18), a condenser (34), a compressor (28) configured to generate a desired pressure in at least a region of the process water distillation system (10) and to convey steam from the evaporator (18) to the condenser (34) during operation of the process water distillation system (10), an inert gas source
(Continued)

(40) configured to supply inert gas to the process water distillation system (10), and a control device (48) configured to control the supply of inert gas from the inert gas source (40) to the process water distillation system (10) in such a way that, at least in certain operating phases of the process water distillation system (10), an oxygen concentration in the process water distillation system (10) does not exceed a permissible maximum value.

13 Claims, 1 Drawing Sheet

(51) Int. Cl.
  | | |
  |---|---|
  | *B01D 3/42* | (2006.01) |
  | *B01D 5/00* | (2006.01) |
  | *C02F 1/00* | (2023.01) |
  | *C02F 1/04* | (2023.01) |

(52) U.S. Cl.
  CPC .............. *C02F 1/008* (2013.01); *C02F 1/041* (2013.01); *C02F 1/043* (2013.01); *C02F 1/048* (2013.01); *C02F 2209/003* (2013.01); *C02F 2209/02* (2013.01); *C02F 2209/03* (2013.01); *C02F 2209/225* (2013.01); *C02F 2301/066* (2013.01)

(56) References Cited

U.S. PATENT DOCUMENTS

| | | | | |
|---|---|---|---|---|
| 5,484,510 A * | 1/1996 | Hartman | .................... | C02F 9/20 422/26 |
| 5,587,055 A * | 12/1996 | Hartman | ................... | B01D 3/42 202/202 |
| 5,772,850 A * | 6/1998 | Morris | ................... | B01D 1/305 159/24.2 |
| 5,906,714 A * | 5/1999 | Gramkow | ............ | B01D 1/2881 159/901 |
| 5,968,321 A * | 10/1999 | Sears | ....................... | B01D 3/42 203/1 |
| 6,365,005 B1 * | 4/2002 | Schleiffarth | ............. | B01D 3/42 159/901 |
| 8,206,558 B2 * | 6/2012 | Fickenscher | ......... | B01D 1/2818 202/202 |
| 8,771,478 B2 * | 7/2014 | Ward | ................... | B01D 1/2887 159/24.2 |
| 8,986,509 B2 * | 3/2015 | Batty | .................... | B01D 5/006 73/61.77 |
| 9,005,404 B2 * | 4/2015 | Batty | ....................... | B01D 3/02 73/61.77 |
| 9,044,693 B2 * | 6/2015 | Batty | .................. | B01D 1/0082 |
| 9,908,789 B2 * | 3/2018 | Ward | ........................ | C02F 1/18 |
| 10,421,030 B2 * | 9/2019 | Boylan | .................. | B01D 3/346 |
| 11,649,174 B2 * | 5/2023 | Schleiffarth | ........... | C02F 1/041 202/176 |
| 2009/0050467 A1 * | 2/2009 | Fickenscher | ............ | C02F 1/048 202/185.1 |
| 2010/0200388 A1 * | 8/2010 | Ward | .................... | B01D 5/006 202/180 |
| 2012/0205231 A1 * | 8/2012 | Batty | ..................... | B01D 5/006 165/185 |
| 2015/0360971 A1 * | 12/2015 | Schleiffarth | ........... | C02F 1/041 |
| 2016/0130156 A1 * | 5/2016 | Ward | .................... | B01D 1/221 202/177 |
| 2016/0296853 A1 * | 10/2016 | Boylan | .................. | B01D 3/005 |
| 2021/0039010 A1 * | 2/2021 | Boylan | .................... | C12H 1/08 |

FOREIGN PATENT DOCUMENTS

| | | |
|---|---|---|
| DE | 1444321 A | 4/1963 |
| DE | 102005049923 B4 | 12/2017 |
| DE | 102018118026 A1 | 1/2019 |
| EP | 17755265 A2 | 4/2007 |
| WO | 2007090583 A1 | 8/2007 |

OTHER PUBLICATIONS

Search Report, International Application No. PCT/EP2021/075242; Mailed Jan. 4, 2022.
Office Action, CN Patent App. 202180074082.2, Apr. 22, 2025.
Examination Report, Indian Patent App. 202337027329, Nov. 18, 2025.
Translation of Examination Report, Chinese Patent App. 202180074082.2, Sep. 4, 2025.
Examination Report, Chinese Patent App. 202180074082.2, Nov. 25, 2025.

* cited by examiner

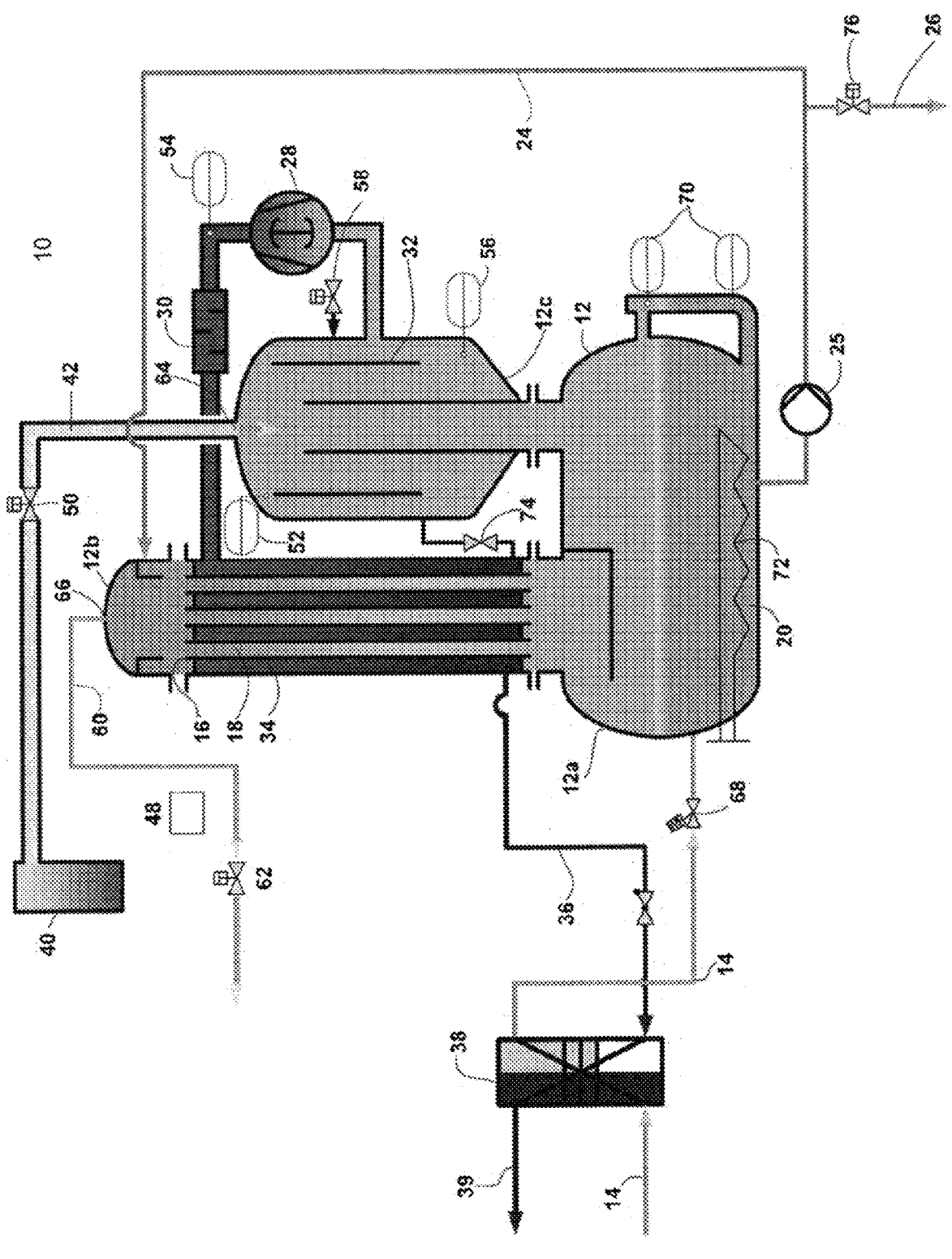

PROCESS WATER DISTILLATION PLANT AND METHOD FOR OPERATING A PROCESS WATER DISTILLATION PLANT

CROSS-REFERENCES TO RELATED APPLICATIONS

This application is based on international patent application PCT/EP 2021/075242 and claims the benefit of the German patent application No. 10 2020 128 823.9 filed on Nov. 2, 2020, the entire disclosures of which are incorporated herein by way of reference.

FIELD OF THE INVENTION

The invention relates to a process water distillation system and a method of operating a process water distillation system.

BACKGROUND OF THE INVENTION

The treatment of industrial wastewater by vacuum distillation represents an effective zo and at the same time economical method for the purification of contaminated liquids, which arise, for example, as washing solutions in immersion, spray and ultra-sonic cleaning systems, as process solutions in surface finishing processes, such as electroplating, pickling, anodizing, vibratory grinding, degreasing, phosphating, burnishing, powder coating or painting, or in drilling, cutting, grinding and drawing applications, as well as in die casting. These fluids can be contaminated, for example, by solvents, oils, waxes, hydraulic fluids and/or coolants.

DE 10 2005 049 923 B4 discloses a distillation system for purifying industrially contaminated wastewater/process water. The distillation system comprises a vessel with an evaporator/condenser unit, as well as a vapor compressor, which provides the pressure ratios required for evaporation/condensation in the distillation system. The evaporator unit serves to evaporate contaminated liquid supplied to the vessel, wherein undesirable constituents, such as silicones, siloxanes, glycols, waxes, oils, amines, emulsifiers, surfactants, salts, etc., collect in an evaporator sump in a bottom area of the vessel. Purified water vapor, on the other hand, rises in the vessel and is extracted by means of the vapor compressor above a mist separator and fed to the evaporator/condenser unit. In the condenser of the evaporator/condenser unit, the water vapor condenses to purified distillate, which is finally supplied to a distillate cooler. The distillate cooler also serves as a preheater for the contaminated liquid to be supplied to the vessel or the evaporator of the evaporator/condenser unit, respectively.

SUMMARY OF THE INVENTION

The invention is directed to the object of providing a process water distillation system suitable for purifying waste water containing highly volatile, combustible impurities, such as solvents. Furthermore, the invention is directed to the object of providing a method of operating such a process water distillation system.

A process water distillation system comprises an evaporator, a condenser and a compressor. The compressor is configured to generate a desired pressure in at least a region of the process water distillation system and to convey steam from the evaporator to the condenser during operation of the process water distillation system. Further, the process water distillation system comprises an inert gas source configured to supply inert gas to the process water distillation system. Preferably, the inert gas source is connected to a portion of a vessel of the process water distillation system which during operation of the process water distillation system is filled with water vapor. For example, the inert gas source may be directly connected to the vessel of the process water distillation system via an inert gas supply line. In particular, the inert gas supply line may open into a region of the vessel which is filled with water vapor during operation of the process water distillation system. Alternatively, however, the inert gas supply line may also open into a line via which the process water to be purified is supplied to the evaporator during operation of the process water distillation system.

A control device of the process water distillation system is configured to control the supply of inert gas from the inert gas source to the process water distillation system in such a way that, at least in certain operating phases of the process water distillation system, an oxygen concentration in the process water distillation system does not exceed a permissible maximum value. The permissible maximum value of the oxygen concentration, which the control device uses as a control parameter for controlling the inert gas source, may be a predefined fixed value, but also a variable dependent on the operating conditions in the process water distillation system.

In the process water distillation system described herein, the inert gas generated by the inert gas source and supplied to the process water distillation system is used as a non-reactive, non-flammable gas to displace oxygen, in particular atmospheric oxygen, from the process water distillation system and thereby reduce the oxygen concentration in the process water distillation system to the permissible maximum value or to maintain it at or below the permissible maximum value during operation of the process water distillation system. The inert gas thus acts as an inerting agent that prevents a flammable and/or explosive gas mixture from forming during the evaporation of the process water during operation of the process water distillation system. This makes it possible to use the process water distillation system also for the treatment of wastewaters containing highly volatile, combustible impurities, such as solvents, so that also such process waters become accessible to low-cost, effective purification by distillation.

In a preferred embodiment of the process water distillation system, the inert gas source is an external steam generator configured to supply water vapor to the process water distillation system. The water vapor used for inerting can easily be further processed together with the water vapor generated in the process water distillation system anyway. This makes water vapor particularly suitable for use as an inert gas in a process water distillation system.

The permissible maximum value of the oxygen concentration in the process water distillation system may be a value depending on a limiting oxygen concentration of a process water to be treated in the process water distillation system. The limiting oxygen concentration is the maximum oxygen concentration in a mixture containing a flammable substance at which an explosion will not occur. In addition to the upper explosion limit and the lower explosion limit, as well as the flash point and the ignition temperature, the limiting oxygen concentration is a parameter of explosive mixtures and may individually be determined or estimated, as required, for various process waters to be treated in the process water distillation system.

For example, for a process water to be purified that contains a certain solvent, such as ethanol, isopropanol, 2-butanol or acetone, the limiting oxygen concentration may be determined individually and the permissible maximum value of the oxygen concentration may be set accordingly individually in dependence on the determined limiting oxygen concentration. However, it is also conceivable to set the permissible maximum value of the oxygen concentration in dependence on an estimated limiting oxygen concentration, for example taking into account a safety buffer. Such an approach is particularly useful if the composition of the process water to be treated in the process water distillation system is not or not exactly known.

For example, the permissible maximum value of the oxygen concentration may be set at about 50% or about 60% of a known, measured or estimated limiting oxygen concentration. For example, for process waters with a low proportion of highly volatile, combustible impurities, a limiting oxygen concentration of 8% may be assumed. Taking into account an appropriate safety buffer, the permissible maximum value of the oxygen concentration may then be set at approx. 4%, for example.

The process water distillation system preferably further comprises an oxygen sensor configured to measure an oxygen concentration in the process water distillation system and to transmit signals characteristic of the oxygen concentration in the process water distillation system to the control device. If desired or necessary, several oxygen sensors may also be present, which in particular may be installed in different areas of the process water distillation system. The control device is preferably configured to control the operation of the process water distillation system in dependence on the signals transmitted by the at least one oxygen sensor.

The oxygen sensor may be used as a monitoring device for monitoring the inerting of the process water distillation system by the inert gas provided by the inert gas source. In such a case, the control device may be configured, for example, to control the process water distillation system to an appropriate emergency operation if the signals transmitted by the oxygen sensor indicate that the inerting of the process water distillation system is not proceeding as planned and the oxygen concentration in the process water distillation system reaches or exceeds the permissible maximum value.

However, the signals supplied by the oxygen sensor to the control device may also enable the oxygen concentration in the process water distillation system to be used as a control parameter for controlling the supply of inert gas from the inert gas source to the process water distillation system. The control device is then in particular configured to control the supply of inert gas from the inert gas source to the process water distillation system in dependence on the signals transmitted by the at least one oxygen sensor.

The process water distillation system preferably further comprises a temperature sensor configured to measure a temperature in the process water distillation system and to transmit signals characteristic of the temperature in the process water distillation system to the control device. If desired or necessary, several temperature sensors may also be present, which in particular may be installed in different areas of the process water distillation system. Furthermore, the process water distillation system may comprise one pressure sensor or more pressure sensors, in particular installed in different areas of the process water distillation system, which is/are configured to measure a pressure in the process water distillation system and to transmit signals characteristic of the pressure in the process water distillation system to the control device. The control device is preferably configured to control the operation of the process water distillation system in dependence on the signals transmitted by the temperature sensor and/or the pressure sensor.

The limiting oxygen concentration of a gas mixture containing a combustible substance usually increases with decreasing pressure. Furthermore, the limiting oxygen concentration for most substances decreases with increasing temperature. Monitoring the pressure and/or the temperature in the process water distillation system thus allows conclusions to be drawn about the influence of these operating parameters on the limiting oxygen concentration and consequently the permissible maximum value of the oxygen concentration in the process water distillation system.

Similar to the oxygen sensor, the temperature sensor and/or the pressure sensor may be used as (a) monitoring device(s) for monitoring the operation of the process water distillation system. In such a case, the control device may be configured, for example, to control the process water distillation system to a suitable emergency operation if the signals transmitted by the temperature sensor and/or the pressure sensor indicate that the operation of the process water distillation system is not proceeding as planned and, for example, the temperature and/or the pressure in the process water distillation system reach(es) or exceed(s) a permissible maximum value.

However, the signals provided by the temperature sensor and/or the pressure sensor to the control device may also enable a use of the temperature and/or the pressure as control parameters for controlling the supply of inert gas from the inert gas source to the process water distillation system. This makes it possible, when controlling the supply of inert gas from the inert gas source to the process water distillation system, to take into account the temperature and pressure dependence of the limiting oxygen concentration of a process water to be treated in the process water distillation system and consequently the influence of the temperature and the pressure on the permissible maximum value of the oxygen concentration in the process water distillation system.

In order to enable proper flooding of the process water distillation system with inert gas and consequently displacement of atmospheric oxygen from the process water distillation system, in particular at an operating start of the process water distillation system, different operating modes of the process water distillation system are conceivable. For example, the control device may be configured to control the operation of the process water distillation system in such a way that, in a supply step, inert gas is supplied from the inert gas source to the process water distillation system until a first pressure above atmospheric pressure is reached in the process water distillation system. The first pressure maybe, for example, max. 1.3 bar. Subsequently, in a pressure reduction step, the pressure in the process water distillation system may be reduced under the control of the control device to a second pressure below the first pressure. The second pressure may be, for example, atmospheric pressure. The supply step and the pressure reduction step may be repeated until the oxygen concentration in the process water distillation system has reached the permissible maximum value.

Alternatively or additionally, the control device may be configured to control the operation of the process water distillation system in such a way that, in a pressure reduction step, the pressure in the process water distillation system is reduced to a third pressure below atmospheric pressure. The third pressure may be, for example, about 500 to 700 mbar. Subsequently, in a supply step, inert gas may be supplied from the inert gas source to the process water distillation system under the control of the control device until a fourth pressure above the third pressure is reached in the process water distillation system. The fourth pressure may be, for example, atmospheric pressure. The pressure reduction step and the supply step may be repeated until the oxygen concentration in the process water distillation system has reached the permissible maximum value.

Furthermore, the control device may also be configured to control the operation of the process water distillation system in such a way that inert gas is supplied from the inert gas source to the process water distillation system via an inlet and simultaneously gas is discharged from the process water distillation system via an outlet until the oxygen concentration in the process water distillation system has reached the permissible maximum value. The inlet for the supply of inert gas from the inert gas source to the process water distillation system and the outlet for the discharge of gas from the process water distillation system should be sufficiently far away from each other to ensure proper flooding of the process water distillation system with inert gas.

Furthermore, in dependence on the further design of the process water distillation system, the relative positioning of the inlet and outlet should take into account the different molecular weights and resulting different densities of air on the one hand and inert gas on the other hand. The inlet and the outlet should be positioned relative to each other such that the inert gas supplied to the process water distillation system can "push" the air completely out of the system, in order to prevent oxygen in the air remaining in the process water distillation system from leading to the development of a critical operating condition, for example when a temperature increase occurs in the process water distillation system due to the supply of inert gas.

Further, the control device may be configured to control the operation of the process water distillation system in such a way that inert gas from the inert gas source is supplied to the process water distillation system at a pressure above atmospheric pressure, for example, 2 bar or more. Further, under the control of the control device, the operation of the process water distillation system may be controlled in such a way that inert gas from the inert gas source is supplied to the process water distillation system in a pulsed mode. For this purpose, the control device may, for example, control an inert gas vent valve such that the inert gas vent valve is opened and closed at a suitable frequency.

The control device may be configured to control the process water distillation system according to only one alternative of the operating modes described above. However, the control device may also be configured to combine the above described operating modes as required, e.g. to accommodate the complex geometrical design of the process water distillation system with different flow cross sections and different components to be flowed through.

Which operating mode or combination of operating modes is particularly suitable to inert the process water distillation system properly and quickly may depend, for example, on the position of the inlet for the supply of inert gas from the inert gas source to the process water distillation system, the position of the outlet for the discharge of gas from the process water distillation system, the pressure and the temperature of the water vapor to be supplied to the process water distillation system in the region of the inlet, and the flow velocity of the water vapor in the region of the inlet. These design and operating parameters may be taken into account by the control device when controlling the inerting process, so that an appropriate operating mode or combination of operating modes can be selected.

The control device is preferably configured to control the operation of the process water distillation system in such a way that, at an operating start of the process water distillation system, in a first step, inert gas is supplied from the inert gas source to the process water distillation system until the oxygen concentration in the process water distillation system has reached the permissible maximum value. For this purpose, for example, an aeration valve is closed under the control of the control device, while an inert gas supply valve serving to control the supply of inert gas to the process water distillation system is opened. The inert gas supply is preferably carried out as described above at a pressure above atmospheric pressure of, for example, 2 bar and in pulsed mode. During the filling of the process water distillation system with inert gas, the system pressure initially increases, but then stabilizes at an equilibrium due to condensation processes, resulting in a stagnation of the air flow in the process water distillation system. The inert gas pulses then cause slight pressure changes in the process water distillation system, which again cause a movement of the air and consequently a displacement of the air from the process water distillation system.

The inerting described here in connection with an operating start of the process water distillation system may also be carried out before cleaning and/or rinsing of the process water distillation system. This can ensure that any flammable and/or explosive gases remaining in the process water distillation system are safely removed from the process water distillation system before the process water distillation system is filled with a cleaning agent.

When the oxygen concentration in the process water distillation system has reached the permissible maximum value, in a second step, the inert gas supply may be stopped for example by closing the inert gas supply valve. Furthermore, the pressure in the process water distillation system may be reduced to a pressure below atmospheric pressure. For this purpose, the control device may, for example, control the compressor accordingly. For example, the pressure in the process water distillation system may be reduced to a pressure of 500 to 700 mbar.

Subsequently, in a third step, process water to be purified may be supplied to the process water distillation system. In particular, the process water to be purified is supplied to the evaporator of the process water distillation system, wherein the reduced pressure prevailing in the process water distillation system at this time can be used to draw the process water into the process water distillation system. In particular, the supply of process water is carried out in such a way that during the supply of process water the supply of air to the process water distillation system is minimized. To achieve this, the process water should be supplied to the process water distillation system as vortex-free as possible. Additionally or alternatively, a diaphragm pump can be used to convey the process water to be purified to the process water distillation system without additional air intake. Further, the control device may be configured to receive signals from a level sensor and to stop the supply of process water to the process water distillation system if the signals from the level sensor indicate that a tank containing process water to be purified has a level that is too low to draw the process water in below the water level and, consequently, there is a risk of too much air entering the process water distillation system.

As described above, during operation, the process water distillation system is under a sub-atmospheric pressure of, for example, 500 to 700 mbar. The control device is therefore preferably further configured to control the operation of the process water distillation system in such a way that, in the event of a planned or an unplanned shut-down, inert gas is supplied from the inert gas source to the process water distillation system until a pressure equalization with the atmospheric pressure is achieved in the process water distillation system. This prevents a large amount of air from entering the process water distillation system.

Pressure equalization by the supply of inert gas can be achieved, for example, by opening the inert gas supply valve under the control of the control device, while the aeration valve and all other valves through which air could enter the process water distillation system remain closed. The inert gas supply is preferably carried out in a pulsed mode until a low overpressure of 150 to 200 mbar above atmospheric pressure is reached. Due to condensation processes, the pressure then drops to atmospheric pressure or to a slight negative pressure which is not critical with regard to an undesired air supply into the process water distillation system.

If the process water distillation system is to be restarted after an unplanned shutdown, the new operating start is preferably carried out as described above. After a planned shutdown, on the other hand, concentrate may be discharged from the process water distillation system after pressure equalization has taken place. In order to prevent air from entering the process water distillation system during this process, the control device is preferably further configured to control the operation of the process water distillation system in such a way that, during a discharge of concentrate from the process water distillation system, inert gas is supplied from the inert gas source to the process water distillation system until the process water distillation system is completely emptied. The inert gas supply is preferably again carried out in a pulsed mode. Furthermore, the inert gas supply should be controlled in such a way that the supplied inert gas volume flow corresponds to the concentrate volume flow discharged from the process water distillation system. This can prevent air from flowing into the process water distillation system through a concentrate discharge line in a direction opposite to the flow direction of the concentrate.

After shutdown and draining of the process water distillation system under inert conditions, the inert gas source can also be shut down. The control device then preferably controls the aeration valve of the process water distillation system to its open state to prevent negative pressure from occurring in the process water distillation system due to subsequent condensation processes. However, when the process water distillation system is in a state of rest, inert conditions do not exist in the system, i.e., the process water distillation system must first be inerted as described above prior to a new operating start.

Further a method of operating a process water distillation system is described, which comprises an evaporator, a condenser, a compressor configured to generate a desired pressure in at least a region of the process water distillation system and to convey steam from the evaporator to the condenser during operation of the process water distillation system, and an inert gas source configured to supply inert gas to the process water distillation system. A control device controls the supply of inert gas from the inert gas source to the process water distillation system in such a way that, at least in certain operating phases of the process water distillation system, an oxygen concentration in the process water distillation system does not exceed a permissible maximum value.

The inert gas source may be an external steam generator configured to supply water vapor to the process water distillation system.

The permissible maximum value of the oxygen concentration in the process water distillation system may be a value depending on a limiting oxygen concentration of a process water to be treated in the process water distillation system.

The process water distillation system may further comprise an oxygen sensor configured to transmit signals characteristic of an oxygen concentration in the process water distillation system to the control device. The control device may then control the operation of the process water distillation system in dependence on the signals transmitted by the oxygen sensor.

The process water distillation system may further comprise a temperature sensor configured to transmit signals characteristic of a temperature in the process water distillation system to the control device, and/or a pressure sensor configured to transmit signals characteristic of a pressure in the process water distillation system to the control device. The control device may then control the operation of the process water distillation system in dependence on the signals transmitted by the temperature sensor and/or the pressure sensor.

The control device may control the operation of the process water distillation system in such a way that, in a supply step, inert gas is supplied from the inert gas source to the process water distillation system until a first pressure above atmospheric pressure is reached in the process water distillation system, subsequently, in a pressure reduction step, the pressure in the process water distillation system is reduced to a second pressure below the first pressure, and the supply step and the pressure reduction step are repeated until the oxygen concentration in the process water distillation system has reached the permissible maximum value.

The control device may further control the operation of the process water distillation system in such a way that, in a pressure reduction step, the pressure in the process water distillation system is reduced to a third pressure below atmospheric pressure, subsequently, in a supply step, inert gas is supplied from the inert gas source to the process water distillation system until a fourth pressure above the third pressure is reached in the process water distillation system, and the pressure reduction step and the supply step are repeated until the oxygen concentration in the process water distillation system has reached the permissible maximum value.

The control device may also control the operation of the process water distillation system in such a way that inert gas is supplied from the inert gas source to the process water distillation system via an inlet and simultaneously gas is discharged from the process water distillation system via an outlet until the oxygen concentration in the process water distillation system has reached the permissible maximum value.

The control device may control the operation of the process water distillation system in such a way that inert gas from the inert gas source is supplied to the process water distillation system at a pressure above atmospheric pressure. Alternatively or additionally, the control device may control the operation of the process water distillation system in such a way that inert gas from the inert gas source is supplied to the process water distillation system in a pulsed mode.

The control device may control the operation of the process water distillation system in such a way that, during an operating start of the process water distillation system, in a first step, inert gas is supplied from the inert gas source to the process water distillation system until the oxygen concentration in the process water distillation system has reached the permissible maximum value, subsequently, in a second step, the supply of inert gas from the inert gas source to the process water distillation system is stopped and the pressure in the process water distillation system is reduced to a pressure below atmospheric pressure, and subsequently, in a third step, process water to be purified is supplied to the process water distillation system, wherein the supply of process water in particular is carried out in such a way that the supply of air to the process water distillation system is minimized during the supply of process water.

The control device may also control the operation of the process water distillation system in such a way that, during a shut-down of the process water distillation system, inert gas is supplied from the inert gas source to the process water distillation system until a pressure equalization with the atmospheric pressure is achieved in the process water distillation system, and/or during a discharge of concentrate from the process water distillation system, inert gas is supplied from the inert gas source to the process water distillation system until the process water distillation system is completely emptied.

Preferred embodiments of the invention are explained in more detail below with reference to the attached schematic drawing, wherein

BRIEF DESCRIPTION OF THE DRAWINGS

FIG. 1 shows a process water distillation system.

DETAILED DESCRIPTION OF PREFERRED EMBODIMENTS

A process water distillation system 10 shown in FIG. 1 comprises a distillation vessel 12 having a first vessel section 12a, a second vessel section 12b, and a third vessel section 12c. Process water to be purified, which may contain impurities such as silicones, siloxanes, glycols, emulsifiers, surfactants, salts, light liquids such as gasoline, benzene, lubricants or oils, and volatile flammable solvents such as ethanol, isopropanol, 2-butanol or acetone, is supplied to the first vessel section 12a of the distillation vessel 12 via a process water supply line 14.

A tube bundle 16 is disposed in the second vessel section 12b. In an evaporator 18 provided in an area of the second vessel section receiving the tube bundle 16, the process water is heated and thereby evaporated, wherein low-volatility impurities collect in a sump 20 of the first vessel section 12a. During operation of the process water distillation system 10, the concentrate collecting in the sump 20 of the first vessel section 12a mixes with the process water supplied to the first vessel section 12a via the process water supply line 14 so that concentrated process water can be conveyed from the first vessel section 12a to the evaporator 18 via a feed line 24. After completion of the distillation process, concentrate from the sump 20 of the first vessel section 12a can be discharged from the distillation vessel 12 via a concentrate discharge line 26 by means of a feed pump 25.

In the process water distillation system 10 shown here, evaporation occurs at a reduced pressure compared to atmospheric pressure, wherein a compressor 28 designed here as a vapor compressor ensures that the desired pressure conditions are set in the process water distillation system 10. Downstream of the compressor 28, a pulsation damper 30 is provided. Water vapor formed in the evaporator 18 fills an upper portion of the first vessel section 12a and the third vessel section 12c during operation of the process water distillation system 10. The water vapor is passed through a mist eliminator 32 provided in the third vessel section 12c and is conveyed to a condenser 34 by means of the compressor 28.

The condenser 34 is defined by an internal volume of the tubes of the tube bundle 16. The distillate cooled and thereby condensed in the condenser 34 is finally conveyed through a connecting conduit 36 into a heat exchanger 38, and is further cooled as it flows through the heat exchanger 38. In the heat exchanger 38, the distillate is brought into thermal contact with process water to be supplied to the distillation vessel 12 of the process water distillation system 10. Consequently, the heat exchanger 38 is used as a process water preheater/distillate cooler in the process water distillation system 10. After flowing through the heat exchanger 38, the distillate is discharged from the process water distillation system 10 via a distillate discharge line 39.

Further, the process water distillation system 10 comprises an inert gas source 40 configured to supply inert gas to the process water distillation system 10. In the embodiment of the process water distillation system 10 shown herein, the inert gas source 40 is connected to the vessel 12 via an inert gas supply line 42. In particular, the inert gas supply line 42 opens into an upper region of the third vessel section 12c, which, during operation of the process water distillation system 10, is filled with water vapor. Alternatively, however, the inert gas supply line 42 may open into a line through which the process water to be purified is supplied to the evaporator 18 during operation of the process water distillation system 10. For example, it is also conceivable to connect the inert gas supply line 42 to the feed line 24 upstream of the evaporator 18.

Here, the external inert gas source 40 is designed in the form of a steam generator configured to supply water vapor to the process water distillation system 10.

The operation of the process water distillation system 10 is controlled by means of a control device 48. Among other things, the control device 48 is configured to control the supply of inert gas from the inert gas source 40 to the process water distillation system 10. For this purpose, the control device 48 controls the inert gas source 40 as well as an inert gas supply valve 50 arranged in the inert gas supply line 42 accordingly in order to, on the one hand, permit or interrupt the generation of inert gas in the inert gas source and, on the other hand, permit or interrupt the conduction of the generated inert gas from the inert gas source 40 into the vessel 12 as required.

The control device 48 controls the supply of inert gas from the inert gas source 40 to the process water distillation system 10 in such a way that, at least in certain operating phases of the process water distillation system 10, an oxygen concentration in the process water distillation system 10 does not exceed a permissible maximum value. The permissible maximum value of the oxygen concentration in the process water distillation system 10 is a value depending on a limiting oxygen concentration of a process water to be treated in the process water distillation system 10 and can be set to, for example, about 4%, taking into account a corresponding safety buffer. However, the permissible maximum value of the oxygen concentration used by the control device 48 as a control parameter for controlling the inert gas source 40 may also be a variable depending on the operating conditions in the process water distillation system 10.

In either case, the inert gas supplied to the process water distillation system 10 from the inert gas source 40 is used to displace oxygen, particularly atmospheric oxygen, from the process water distillation system 10 and thereby reduce the oxygen concentration in the process water distillation system 10 to the permissible maximum value and maintain it at or below the permissible maximum value during operation of the process water distillation system 10, respectively. This prevents the formation of a flammable and/or explosive gas mixture during operation of the process water distillation system 10 when the process water is evaporated, even if the process water to be treated in the process water distillation system 10 contains readily volatile, flammable impurities, such as solvents.

The process water distillation system 10 further comprises an oxygen sensor 52 that measures an oxygen concentration in the process water distillation system 10 and transmits signals characteristic of the oxygen concentration in the process water distillation system 10 to the control device 48. Further, a temperature sensor 54 is provided which measures a temperature in the process water distillation system 10 and transmits signals characteristic of the temperature in the process water distillation system 10 to the control device 48. A pressure sensor 56 is provided for measuring the pressure in the process water distillation system 10 and for transmitting signals characteristic of the pressure in the process water distillation system 10 to the control device 48.

The control device 48 controls the operation of the process water distillation system 10 in dependence on the signals transmitted by the sensors 52, 54, 56. In particular, the sensors 52, 54, 56 may be used as monitoring devices for monitoring the inerting of the process water distillation system 10 by the inert gas provided by the inert gas source 40 and for monitoring the proper operation of the process water distillation system 10. For example, the control device 48 may be configured to control the process water distillation system 10 to an appropriate emergency operation if the signals transmitted by the oxygen sensor 52 indicate that the inerting of the process water distillation system 10 is not proceeding as planned and the oxygen concentration in the process water distillation system 10 reaches or exceeds the permissible maximum value. Similarly, the control device 48 may respond to inadequate temperature and/or pressure levels in the process water distillation system 10 detected by the sensors 54, 56 by initiating an appropriate emergency operation. However, the signals provided by the sensors 52, 54, 56 to the control device may also enable a use of the oxygen concentration, the temperature and/or the pressure in the process water distillation system 10 as (a) control parameter(s) for controlling the supply of inert gas from the inert gas source 40 to the process water distillation system 10.

At an operating start of the process water distillation system 10, the control device 48 controls the operation of the process water distillation system 10 in such a way that first, in a first step, inert gas is supplied from the inert gas source 40 to the process water distillation system 10, i.e., the third vessel section 12c, until the oxygen concentration in the process water distillation system 10 has reached the permissible maximum value. For this purpose, under the control of the control device 48, an aeration valve 58 connected to the third vessel section 12c is closed while the inert gas supply valve 50 is opened. In particular, the inert gas is supplied to the process water distillation system 10 under the control of the control device 48 at a pressure above atmospheric pressure, for example 2 bar, and in a pulsed mode. To implement the pulsed inert gas supply, an inert gas vent valve 62 disposed in an inert gas vent line 60 is controlled by the control device 48 such that the inert gas vent valve 62 is opened and closed at a suitable frequency.

To enable proper flooding of the process water distillation system 10 with inert gas at the operating start of the process water distillation system 10, various modes of operation of the process water distillation system are conceivable in addition to or as an alternative to the pulsed supply of the inert gas under an elevated pressure. For example, the control device 48 may control the operation of the process water distillation system 10 in such a way that, in a supply step, inert gas is supplied from the inert gas source 40 to the process water distillation system 10 until a first pressure above atmospheric pressure of, for example, a maximum of 1, 3 bar is reached in the process water distillation system 10. Subsequently, in a pressure reduction step under the control of the control device 48, the pressure in the process water distillation system may be reduced to a second pressure below the first pressure, for example atmospheric pressure. The supply step and the pressure reduction step may be repeated until the oxygen concentration in the process water distillation system 10 has reached the permissible maximum value.

Alternatively or additionally, the control device 48 may control the process water distillation system 10 at the operating start to reduce the oxygen concentration in the process water distillation system 10 in such a way that, in a pressure reduction step, the pressure in the process water distillation system 10 is reduced to a third pressure below atmospheric pressure of, for example, about 500 to 700 mbar. Subsequently, in a supply step, inert gas may be supplied from the inert gas source 40 to the process water distillation system 10 until a fourth pressure above the third pressure, for example atmospheric pressure, is reached in the process water distillation system. The pressure reduction step and the supply step may be repeated until the oxygen concentration in the process water distillation system has reached the permissible maximum value.

Finally, it is also conceivable to control the operation of the process water distillation system 10 in such a way that inert gas is supplied from the inert gas source 40 to the process water distillation system 10 via an inlet 64 defined by the mouth of the inert gas supply line 42 into the third vessel section 12c, and simultaneously gas is discharged from the process water distillation system 10 via an outlet 66 defined by a connection point of the inert gas vent line 60 with the second vessel section 12b, until the oxygen concentration in the process water distillation system has reached the permissible maximum value. As can be seen in the FIGURE, the inlet 64 and the outlet 66 are located sufficiently far apart from each other in different regions of the process water distillation system 10 to promote proper flooding of the process water distillation system 10 with inert gas.

The inerting described herein in connection with an operating start of the process water distillation system 10 may also be performed prior to cleaning and/or rinsing of the process water distillation system 10. This can ensure that any flammable and/or explosive gases that may have remained in the process water distillation system 10 are safely removed from the process water distillation system 10 before the process water distillation system is filled with a cleaning agent.

When the oxygen concentration in the process water distillation system 10 has reached the permissible maximum value, in a second step, the inert gas supply is stopped under the control of the control device 48 by closing the inert gas supply valve 50. Further, the pressure in the process water distillation system 10 is reduced to a pressure below atmospheric pressure by the control device 48 starting the compressor 28. For example, the pressure in the process water distillation system 10 may be reduced to a pressure of 500 to 700 mbar.

Subsequently, in a third step, process water to be purified is supplied into the process water distillation system 10 by opening, under the control of the control device 48, a process water supply valve 68 arranged in the process water supply line 14 and using the reduced pressure prevailing in the process water distillation system 10 at this time to draw the process water into the process water distillation system 10. In order to minimize the supply of air into the process water distillation system 10 during the process water supply, the process water is supplied to the process water distillation system 10 as vortex-free as possible and in compliance with a filling level in a tank receiving the process water to be purified.

The process water supply to the first tank section 12*a* is monitored by level sensors 70. As soon as the signals provided by the level sensors 70 indicate a sufficient level of the first vessel section 12*a*, the control device 48 starts up a start-up heater 72, the system having already undergone some pre-heating due to inerting with water vapor. During the heating process, the compressor 28 conveys the steam between the evaporator 18 and the condenser 34 in a closed loop, with a bypass valve 74 that opens or interrupts a connection between the second vessel section 12*b* and the third vessel section 12*c* depending on the operating condition being open. As a result, the compressed steam is heated and releases this heat to the water present in the system. During the heating process, the pulsed supply of inert gas from the inert gas source 40 is maintained to prevent a pressure drop caused by condensation processes and a resulting air ingress into the system.

When the temperature required for continuous distillation is reached, the bypass valve 74 is closed and distillation is started, wherein the oxygen concentration in the process water distillation system 10 can be monitored throughout the distillation process. The distillation takes place under a negative pressure below atmospheric pressure of, for example, 500 to 700 mbar. In the event of a planned or unplanned shutdown of the process water distillation system 10, the control device 48 therefore controls the operation of the process water distillation system 10 in such a way that inert gas is first supplied to the process water distillation system 10 from the inert gas source 40 until pressure equalization with atmospheric pressure is achieved in the process water distillation system 10. For this purpose, the control device 48 starts up the inert gas source 40 and opens the inert gas supply valve 50. At the same time, all other valves through which air could enter the process water distillation system 10 remain closed. The inert gas supply is preferably carried out in a pulsed mode until a slight overpressure of 150 to 200 mbar above atmospheric pressure is reached. Due to condensation processes, the pressure then drops to atmospheric pressure or to a slight and thus uncritical with respect to an undesired air supply into the process water distillation system 10 negative pressure.

When the process water distillation system 10 is to be restarted after an unplanned shut-down, the renewed operating start is preferably performed as described above. In contrast, after a planned shut-down, after pressure equalization has occurred, concentrate is discharged from the process water distillation system 10 by means of the feed pump 25 through an open concentrate discharge valve 76 arranged in the concentrate discharge line 26, wherein, during the discharge of concentrate from the process water distillation system 10, inert gas is supplied from the inert gas source 40 to the process water distillation system 10 under the control of the control device 48 in a pulsed mode until the process water distillation system 10 is completely emptied.

Further, the inert gas supply is controlled by a corresponding actuation of the inert gas supply valve 50 such that the inert gas volume flow supplied corresponds to the concentrate volume flow discharged from the process water distillation system.

After the process water distillation system 10 has been shut down and drained under inert conditions, the inert gas source 40 may also be shut down. To prevent negative pressure from developing in the process water distillation system due to subsequent condensation processes, the control device 48 controls the aeration valve 58 to its open state. A renewed inerting of the process water distillation system 10 is then required for a renewed operating start.

The invention claimed is:

1. A process water distillation system comprising:
   an evaporator,
   a condenser,
   a compressor configured to generate a desired pressure in at least a region of the process water distillation system and to convey steam from the evaporator to the condenser during operation of the process water distillation system,
   an inert gas source configured to supply inert gas to the process water distillation system,
   a control device configured to control the supply of inert gas from the inert gas source to the process water distillation system in such a way that, at least in certain operating phases of the process water distillation system, an oxygen concentration in the process water distillation system does not exceed a permissible maximum value, and
   an oxygen sensor configured to transmit signals characteristic of an oxygen concentration in the process water distillation system to the control device, wherein the control device is configured to control the supply of inert gas from the inert gas source to the process water distillation system in dependence on the signals transmitted by the oxygen sensor,
   wherein the control device is configured to control the operation of the process water distillation system in such a way that
   in a supply step, inert gas is supplied from the inert gas source to the process water distillation system until a first pressure above atmospheric pressure is reached in the process water distillation system,
   subsequently, in a pressure reduction step, the pressure in the process water distillation system is reduced to a second pressure below the first pressure, and
   the supply step and the pressure reduction step are repeated until the oxygen concentration in the process water distillation system has reached the permissible maximum value.

2. The process water distillation system according to claim 1, wherein:
   the inert gas source is an external steam generator configured to supply water vapor to the process water distillation system, and/or
   the permissible maximum value of the oxygen concentration in the process water distillation system is a value depending on a limiting oxygen concentration of a process water to be treated in the process water distillation system.

3. The process water distillation system according to claim 1, further comprising:

a temperature sensor configured to transmit signals characteristic of a temperature in the process water distillation system to the control device, and/or a pressure sensor configured to transmit signals characteristic of a pressure in the process water distillation system to the control device, wherein the control device is configured to control the operation of the process water distillation system in dependence on the signals transmitted by the temperature sensor and/or the pressure sensor.

4. The process water distillation system according to claim 1 wherein the control device is configured to control the operation of the process water distillation system in such a way that in a pressure reduction step, the pressure in the process water distillation system is reduced to a third pressure below atmospheric pressure, subsequently, in a supply step, inert gas is supplied from the inert gas source to the process water distillation system until a fourth pressure above the third pressure is reached in the process water distillation system, the pressure reduction step and the supply step are repeated until the oxygen concentration in the process water distillation system has reached the permissible maximum value.

5. The process water distillation system according to claim 1, wherein the control device is configured to control the operation of the process water distillation system in such a way that inert gas is supplied from the inert gas source to the process water distillation system via an inlet and simultaneously gas is discharged from the process water distillation system via an outlet until the oxygen concentration in the process water distillation system has reached the permissible maximum value.

6. The process water distillation system according to claim 1, wherein the control device is configured to control the operation of the process water distillation system in such a way that inert gas from the inert gas source is supplied to the process water distillation system at a pressure above atmospheric pressure, and/or inert gas from the inert gas source is supplied to the process water distillation system in a pulsed mode.

7. The process water distillation system according to claim 1, wherein:

the control device is configured to control the operation of the process water distillation system in such a way that at an operating start of the process water distillation system, in a first step, inert gas is supplied from the inert gas source to the process water distillation system until the oxygen concentration in the process water distillation system has reached the permissible maximum value, subsequently, in a second step, the supply of inert gas from the inert gas source to the process water distillation system is stopped and the pressure in the process water distillation system is reduced to a pressure below atmospheric pressure, and subsequently, in a third step, process water to be purified is supplied to the process water distillation system, wherein the supply of process water in particular is carried out in such a way that the supply of air into the process water distillation system is minimized during the supply of process water, and/or the control device is configured to control the operation of the process water distillation system in such a way that during a shut-down of the process water distillation system, inert gas is supplied from the inert gas source to the process water distillation system until a pressure equalization with the atmospheric pressure is achieved in the process water distillation system, and/or during a discharge of concentrate from the process water distillation system, inert gas is supplied from the inert gas source to the process water distillation system until the process water distillation system is completely emptied.

8. A method of operating a process water distillation system comprising:

an evaporator, a condenser, a compressor configured to generate a desired pressure in at least a region of the process water distillation system and to convey steam from the evaporator to the condenser during operation of the process water distillation system, and an inert gas source configured to supply inert gas to the process water distillation system, wherein a control device controls the supply of inert gas from the inert gas source to the process water distillation system in such a way that, at least in certain operating phases of the process water distillation system, an oxygen concentration in the process water distillation system does not exceed a permissible maximum value, and wherein the process water distillation system further comprises an oxygen sensor configured to transmit signals characteristic of an oxygen concentration in the process water distillation system to the control device, wherein the control device controls the supply of inert gas from the inert gas source to the process water distillation system in dependence on the signals transmitted by the oxygen sensor, wherein the control device controls the operation of the process water distillation system in such a way that in a supply step, inert gas is supplied from the inert gas source to the process water distillation system until a first pressure above atmospheric pressure is reached in the process water distillation system, subsequently, in a pressure reduction step, the pressure in the process water distillation system is reduced to a second pressure below the first pressure, and the supply step and the pressure reduction step are repeated until the oxygen concentration in the process water distillation system has reached the permissible maximum value.

9. The method according to claim 8, wherein:

the inert gas source is an external steam generator configured to supply water vapor to the process water distillation system, and/or the permissible maximum value of the oxygen concentration in the process water distillation system is a value depending on a limiting oxygen concentration of a process water to be treated in the process water distillation system.

10. The method according to claim 8, wherein the process water distillation system further comprises:

a temperature sensor configured to transmit signals characteristic of a temperature in the process water distillation system to the control device, and/or a pressure sensor configured to transmit signals characteristic of a pressure in the process water distillation system to the control device, wherein the control device controls the operation of the process water distillation system in dependence on the signals transmitted by the temperature sensor and/or the pressure sensor.

11. The method according to claim 8, wherein:

the control device controls the operation of the process water distillation system in such a way that in a pressure reduction step, the pressure in the process water distillation system is reduced to a third pressure below atmospheric pressure, subsequently, in a supply step, inert gas is supplied from the inert gas source to the process water distillation system until a fourth pressure above the third pressure is reached in the process water distillation system, the pressure reduction step and the supply step are repeated until the oxygen concentration in the process water distillation system has reached the permissible maximum value, and/or the control device controls the operation of the process water distillation system in such a way that inert gas is supplied from the inert gas source to the process water distillation system via an inlet and simultaneously gas is discharged from the process water distillation system via an outlet until the oxygen concentration in the process water distillation system has reached the permissible maximum value.

12. The method according to claim 8, wherein:

the control device controls the operation of the process water distillation system in such a way that inert gas from the inert gas source is supplied to the process water distillation system at a pressure above atmospheric pressure, and/or inert gas from the inert gas source is supplied to the process water distillation system in a pulsed mode.

13. The method according to claim 8, wherein:

the control device controls the operation of the process water distillation system in such a way that at an operating start of the process water distillation system, in a first step, inert gas is supplied from the inert gas source to the process water distillation system until the oxygen concentration in the process water distillation system has reached the permissible maximum value, subsequently, in a second step, the supply of inert gas from the inert gas source to the process water distillation system is stopped and the pressure in the process water distillation system is reduced to a pressure below atmospheric pressure, and subsequently, in a third step, process water to be purified is supplied to the process water distillation system, wherein the supply of process water in particular is carried out in such a way that the supply of air into the process water distillation system is minimized during the supply of process water, and/or the control device controls the operation of the process water distillation system in such a way that during a shut-down of the process water distillation system, inert gas is supplied from the inert gas source to the process water distillation system until a pressure equalization with the atmospheric pressure is achieved in the process water distillation system, and/or during a discharge of concentrate from the process water distillation system, inert gas is supplied from the inert gas source to the process water distillation system until the process water distillation system is completely emptied.

* * * * *